UNITED STATES PATENT OFFICE.

STUART GWYNN, OF NEW YORK, N. Y., ASSIGNOR TO ALFRED B. ELY, OF NEWTON, MASSACHUSETTS.

IMPROVED PROCESS FOR SATURATING WOOD, CLOTH, PAPER, &c., WITH PARAFFINE.

Specification forming part of Letters Patent No. 52,788, dated February 20, 1866.

*To all whom it may concern:*

Be it known that I, STUART GWYNN, of New York, in the county of New York and State of New York, have invented or discovered a new and useful Improvement in the Use of Paraffine—viz., in Saturating or Impregnating therewith Paper, Cloth, Wood, and other Proper Porous Substances; and I do hereby declare that the following is a full, clear, and exact description of the application and operation of the same.

The nature of my invention or discovery consists in the saturation or impregnation of paper, wood, and other porous substances with paraffine, by which they acquire great durability, toughness, and unchangeability, and become in combination essentially new substances in many of their qualities and characteristics.

Paraffine is a compound of hydrogen and carbon so thoroughly united that hardly any, if any, other substance having an affinity for hydrogen will take away its hydrogen, and scarcely any, if any, other substance having an affinity for carbon will take away its carbon. When melted it readily permeates porous substances that may be immersed in it, and fills up all the cells and becomes incorporated with them so perfectly and thoroughly as to become essentially inseparable from them, and to impart to them many of its own peculiar qualities. It is insoluble in acids, alkalies, or gases, and is unaffected by the action of the elements. Substances saturated with paraffine not only acquire in great measure insolubility in acids, alkalies, and gases, but greatly-increased tenacity, toughness, power of endurance and of resistance to the action of the elements.

Paper satuated with paraffine becomes much harder, tougher, and firmer, and assumes much the appearance of parchment, with an unctuous but not greasy surface. In this state it will not only resist the action of water, but of strong acids, without perceptible effect; and so great is the repellent power of this substance to moisture that, although paper or cloth saturated with it be pierced with small holes, as pin-holes, water will not pass through.

Soft wood treated with paraffine becomes harder and denser and almost indestructible. When saturated and subjected to pressure I have no doubt it would acquire a character that would eminently fit it for the tool of the engraver.

Saturated paper will answer every purpose in many cases where oiled or painted cloths are now used, and saturated cloths will equally take the place of leather, and canvas when prepared will be unaffected by mildews. The uses of both paper and cloth, where ventilation is desired in connection with the exclusion of moisture, will be manifold. The softer woods will, for many purposes, supplant the use of harder kinds.

For my purposes the paraffine must be used at a considerably high temperature, and ordinarily the articles to be saturated may be first wet, as then the heated paraffine will more readily enter the pores from which the water is expelled. When the paraffine is thus combined with the substances they seem together to form a new substance, inasmuch as it cannot be again expelled. It cannot be very well used in connection with animal substances, as the heat will be likely to act deleteriously.

For merely coating substances I do not desire to use it; but my aim is essentially to saturate the material with it when it is melted and raised to a high degree of heat.

I am aware that paraffine has been used in an imperfect manner and condition for cartridge-paper, and although my discovery dates prior to 1864, I do not now claim it for that purpose; but

I claim—

1. The use of paraffine, melted and heated to a high degree, for saturating cloth and wood, in the manner and for the purposes substantially as described.

2. Its use for saturating paper when it is to be used for roofing and other similar outside covering, and for linings for boxes and such like, when durability, imperviousness to moisture, and resistance to the action of acids and the elements are desired, as also for linings for hats, shoes, garments, and other articles of fibrous materials.

STUART GWYNN.

Witnesses:
S. N. SKINNER,
W. M. PARKER.